United States Patent
Kinuhata et al.

[11] 3,970,776
[45] July 20, 1976

[54] SYSTEM FOR CONVERTING THE NUMBER OF LINES OF A TELEVISION SIGNAL

[75] Inventors: Koji Kinuhata, Tokyo; Kitsutaro Amano, Yokohama; Hiroshi Sasaki, Nagareyama; Hideo Yamamoto, Sagamihara; Kosho Shibata, Niza; Kazuo Yamada, Tokyo, all of Japan

[73] Assignee: Kokusai Denshin Denwa Kabushiki Kaisha, Japan

[22] Filed: May 22, 1974

[21] Appl. No.: 472,505

[30] Foreign Application Priority Data
May 24, 1973 Japan .................... 48-57159

[52] U.S. Cl. .................... 178/6.8; 178/DIG. 24
[51] Int. Cl.² .................... H04N 5/02
[58] Field of Search .................... 178/DIG. 24, 6.8

[56] References Cited
UNITED STATES PATENTS

| | | | |
|---|---|---|---|
| 3,582,543 | 6/1971 | Davies | 178/DIG. 24 |
| 3,676,585 | 7/1972 | Kaneko et al. | 178/DIG. 24 |
| 3,810,174 | 5/1974 | Heard | 178/DIG. 24 |
| 3,830,971 | 8/1974 | van de Polder | 178/DIG. 24 |

OTHER PUBLICATIONS

Control System of Television Standard Conversion, Oki Rev (Japan) vol. 39, No. 1, Demizu et. al. pp. 47–62.
Full Screen TV Standards Converter, Davies, Wireless World Jan. 1969, pp. 8–10.

*Primary Examiner*—Howard W. Britton
*Assistant Examiner*—Michael A. Masinick
*Attorney, Agent, or Firm*—Robert E. Burns; Emmanuel J. Lobato; Bruce L. Adams

[57] ABSTRACT

A system for converting the number of lines of a television signal having interlaced frames each formed by signals of two adjacent fields, in which signals of each field of each frame are formed by sequentially weighting and combining line signals of the former and the latter of the two fields under the conditions that the order of lines is not reversed in the output frame and that the lines are not repeated in the same field.

2 Claims, 17 Drawing Figures

SYSTEM FOR CONVERTING THE NUMBER OF LINES OF A TELEVISION SIGNAL

This invention relates to a system for converting the number of lines in one field of a television signal having frames each formed by two adjacent fields.

An object of this invention is to provide a system for converting the number of lines of one field of a television signal having frames each formed by two adjacent fields, in which one field of an output television signal is formed by two interlaced successive fields, that is, one frame of an input television signal.

The principle, construction and operation of this invention will be clearly understood from the following detailed description taken in conjunction with the accompanying drawings, in which.

For ready understanding of the principle of the invention, a description will be given first of a conventional method for conversion of the number of lines from a television system adopted in Europe, i.e. a 625/50 system, to that in the United States and in Japan, i.e. a 525/60 system.

Figure 1A:
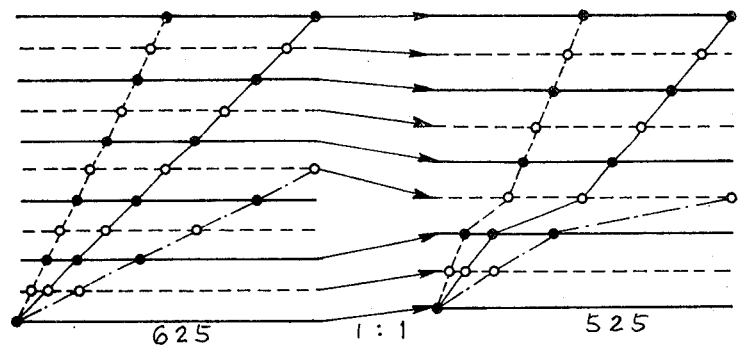
FIGS. 1A, 1B, 2A and 2B are line arrangement diagrams explanatory of conventional line conversion.

In case of decreasing the number of lines for conversion of the number of lines in the prior art, as shown in FIG. 1A, only a required number of those lines (for example, five lines indicated by solid lines) for forming one field of an output television signal, which are the closest to the lines of the output television signal, are extracted from lines (for example, six lines indicated by solid lines) of one field of an input television signal, thereby to achieve conversion of the number of lines. Further, also in case of increasing the number of lines as shown in FIG. 1B, those of the lines (for example, five lines indicated by solid lines) of one field of the input television signal, which are the closest to the lines of the output television signal, are repeatedly used as occasion demands, thus obtaining a required number of lines (for example, six lines indicated by solid lines) for forming one field of the output television signal.

Figure 1B:
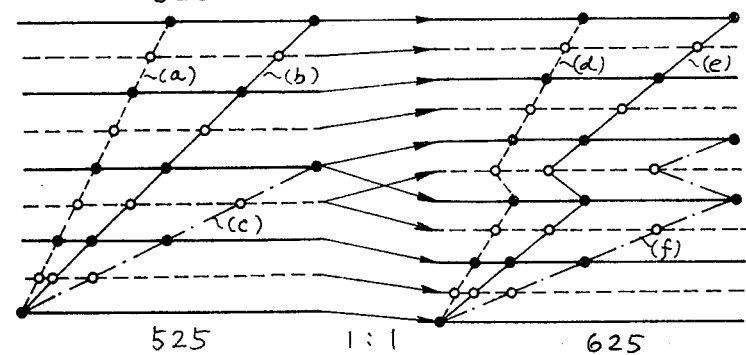
Figure 2A:
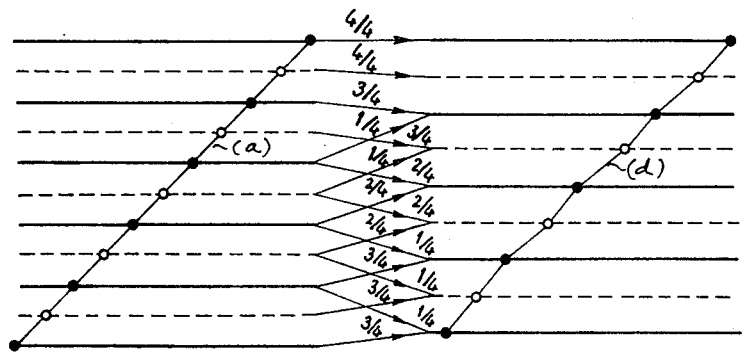
Figure 2B:
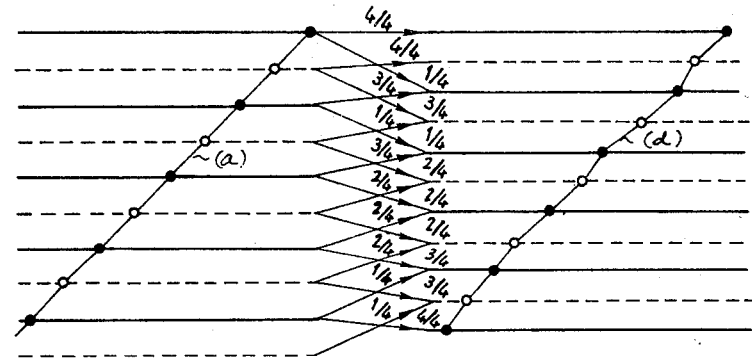
Figure 3A:
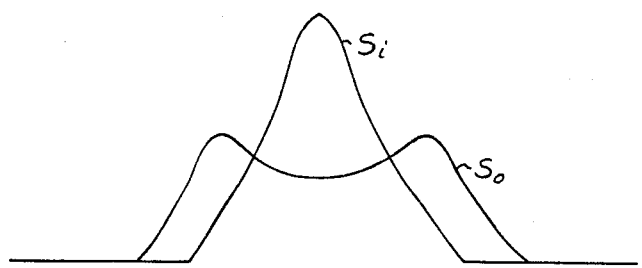
FIGS. 3A and 3B are waveform diagrams showing waveform distortion caused by the conventional line conversion.
Figure 3B:
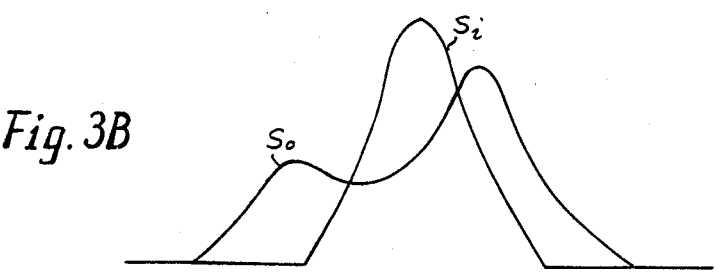

As a result of this, the straight lines $a$, $b$ and $c$ before conversion become such as identified by $d$, $e$ and $f$ to produce distortion as shown in FIG. 1B. To avoid this, there is employed a method such as is shown in FIGS. 2A and 2B in which two adjacent lines in the same field are weighted respectively and combined (numerical values indicating weight factors to visually alleviate distortion). However, in a case where a picture signal, especially a picture signal $S_o$ such as a white signal inclined by 45° to the scanning lines exists as shown in FIG. 3A (weight combining ratio 2/4 : 2/4) or in FIG. 3B (weight combining ratio 1/4 : 3/4), such a method is defective in that the signal waveform $S_o$ after conversion becomes remarkedly dull owing to a level change by the signal to produce greatly deteriorated resolution.

In accordance with this invention, the aforesaid defects can be effectively eliminated as described below.

Figure 4A:
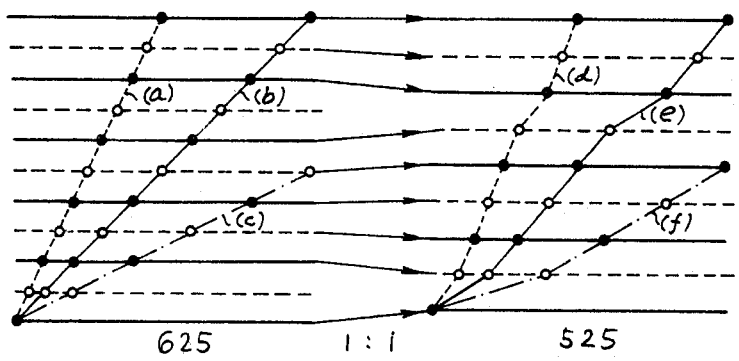
FIGS. 4A, 4B, 5A and 5B are line arrangement diagrams explanatory of line conversion according to this invention.
Figure 4B:
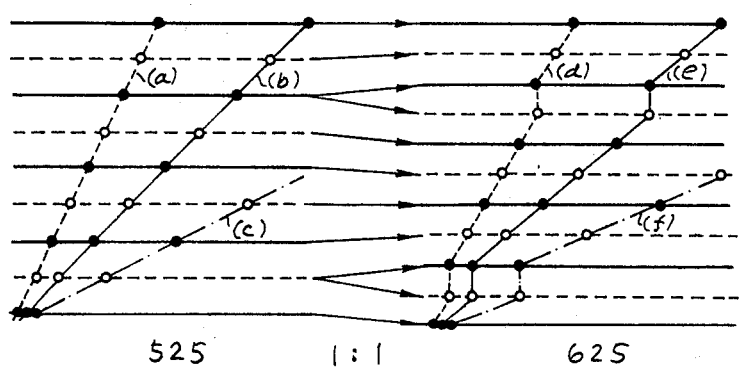

With the system of this invention, in case of decreasing the number of lines, as shown in FIG. 4A, those lines (for example, eleven lines indicated by solid and broken lines) of two interlaced successive fields, that is, one frame, of an input television signal which are the closest to the lines (for example, five lines indicated by solid lines) of an output television signal, are extracted and sequentially selected under the conditions that the order of the lines in the output frame is not reversed and that no repetition is effected in the same field, thus forming each output field. This apparently enables remarked alleviation of the distortion, as compared with the converted picture shown in FIGS. 1A and 1B. Since the method for increasing the number of lines is apparent from FIG. 4B, no detailed description will be given. Namely, it is possible to obtain a converted signal without making its waveform dull and to reduce distortion of the picture.

Figure 5A:
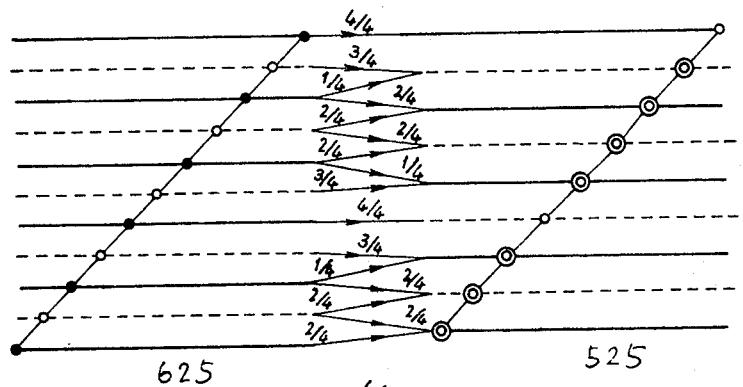
Figure 5B:
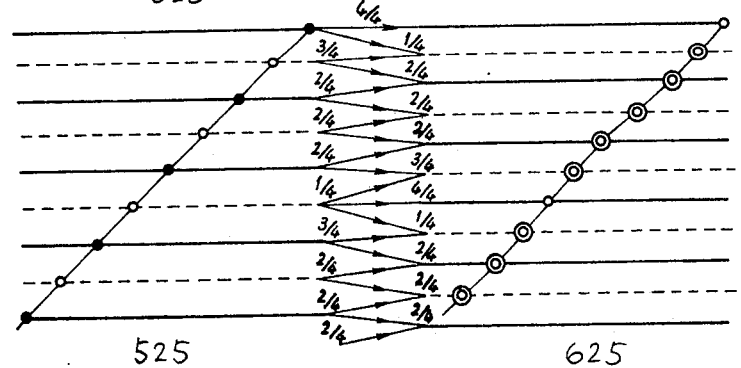
Figure 6A:
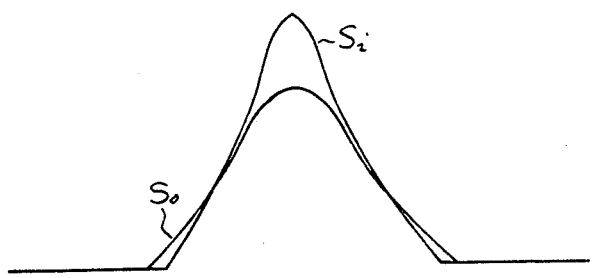
FIGS. 6A and 6B are waveform diagrams showing waveform distortion caused by the line conversion of this invention.
Figure 6B:
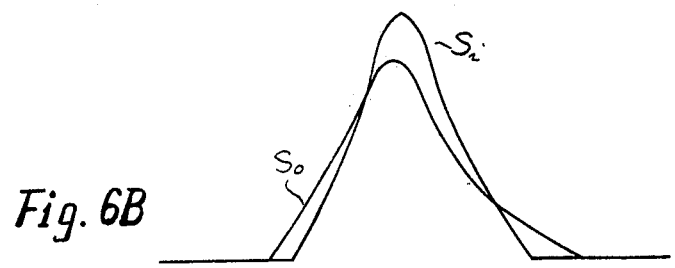

In case of further reducing the distortion of the picture even if resolution is a little lowered, it is possible to adopt such a method as is shown in FIGS. 5A and 5B, in which two adjacent lines in the same frame are weighted respectively and combined as occasion demands. FIG. 5A shows the case of converting the number of lines from 625 to 525 and FIG. 5B the case of converting the number of lines from 525 to 625. Also in this case, dullness of the waveform due to the above weight combining is far smaller than that in FIGS. 3A and 3B as shown in FIGS. 6A and 6B under the same conditions. This naturally deteriorates resolution a little as compared with that in the case of no weight combining of lines, but the amount of deterioration is negligibly small as compared with that in the prior art.

It is apparent that the above results are caused by an essential difference between signal processing in one field and that in one frame. Namely, as described previously, each complete picture of the television signal is formed by one frame, that is, two successive fields, so that the formation of an output signal from one frame of an input signal is nothing but effective use of the amount of information twice as large as that in the case of forming the output signal from one field of the input signal. Consequently, deterioration of the quality of the converted picture can easily be suppressed to substantially ½.

With reference to the drawings, an example of this invention will be described as being applied to the conversion of the number of lines of a television signal of the 625/50 system to that of a television signal of the 525/60 system.

Figure 7:
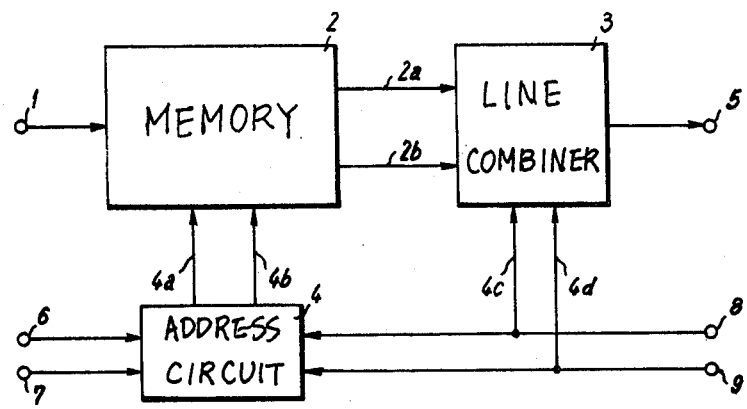
FIG. 7 is a block diagram illustrating an example of this invention.
Figure 8:
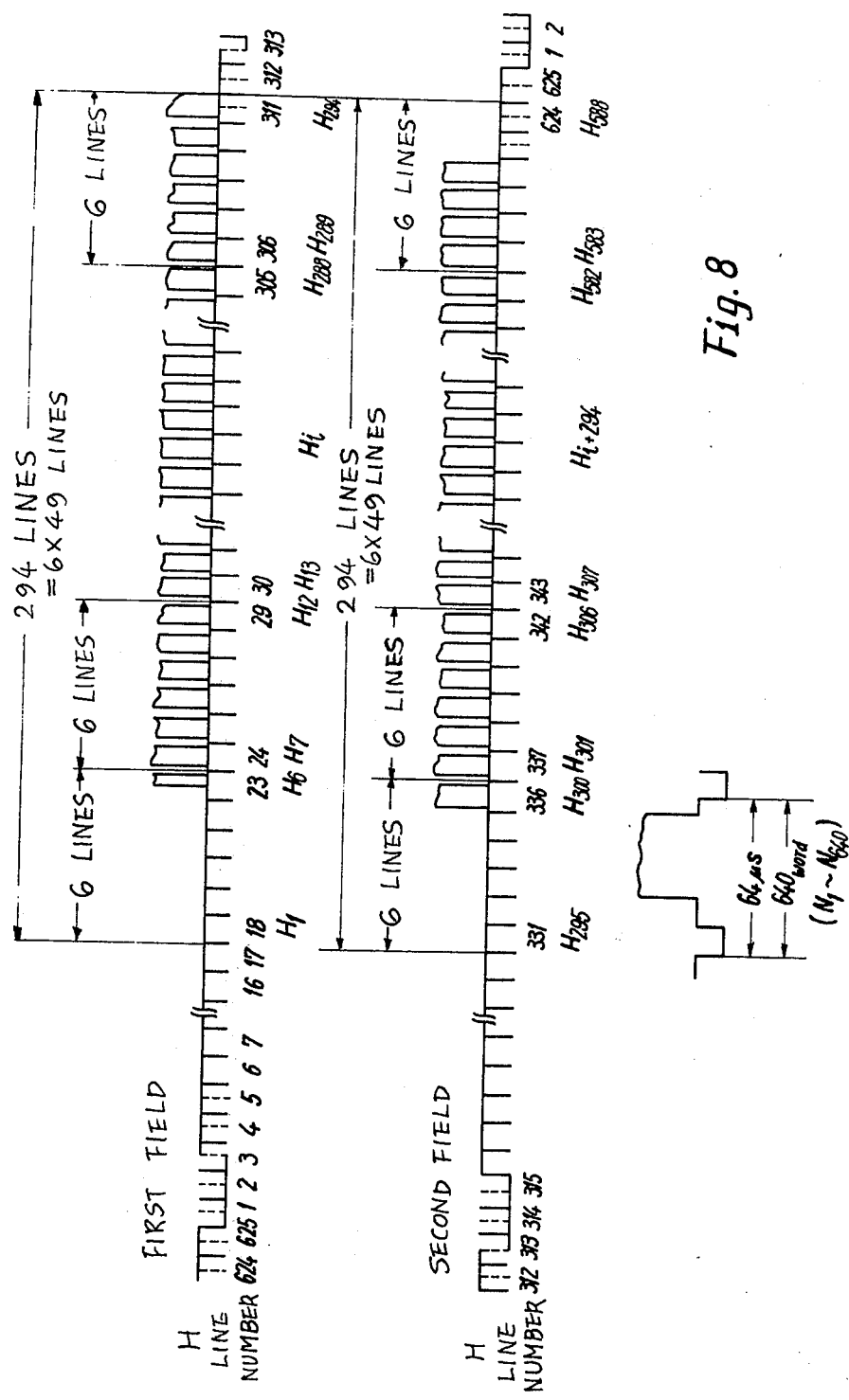
FIG. 8 is a time chart explanatory of waveforms in a 625/50 system.

FIG. 7 is a fundamental system diagram for realizing the number-of-lines conversion system of this invention. Reference numeral 1 indicates a signal input terminal, 2 designates a memory; 3 represents a line combiner; 4 denotes an address circuit (e.g. a non-locked control device of the kind shown in U.S. Pat. No. 3,676,585) for controlling the address-designation, the write operation and the read operation of the memory 2, 5 identifies a signal output terminal; 6 and 7 show input terminals for horizontal and vertical synchronizing pulses of the 625/50 system, respectively; and 8 and 9 refer to input terminals for horizontal and vertical synchronizing pulses of the 525/60 system, respectively. The input television signal of the 625/50 system includes information of 625 lines in first and second fields, that is, in one frame. Let it be assumed that this television signal is sampled, for example, at 10 MHz, converted into an 80M-bit PCM code system, applied as 8-bit parallel digital code words to the signal input terminal 1 and then stored in the memory 2. Then, a signal of one field of the 525/60 system is produced from the signal of one frame of the 625/50 system stored in the memory 2. Since a field blanking period exists in 625 lines of the input signal, there is no need of storing all the 625 lines. In the present example, information of 588 lines except 37 lines of the field blanking period is stored. Namely, as illustrated in FIG. 8, 18th to 311th lines in the first field and 331st to 624th lines in the second field are sequentially stored in the memory 2 until the instant of writing the next subsequent frame. Signals of 245 lines are produced from the stored 588 lines by weight-combining signals of five lines for each group of ten lines in twelve lines as will be described later, and a vertical blanking signal of the 525/60 system is added to the above signals of produced 245 lines to provide an output signal. Thus, the output signal of 262.5 lines for one field is produced. Lines of the input signal are marked with numbers (H numbers) $H_1$ to $H_{294}$ and $H_{295}$ to $H_{588}$ for the address designation of the memory 2. Futher, in this case, one line has information of 80M bit/sec. $\times$ 64$\mu$sec. = 5125 bits. However, these information bits are divided into groups of 8 bits (= 1 word) and marked with numbers (N numbers) $N_1$ to $N_{640}$ in the order of arrangement of the words. At this time, it is also possible to store the signal except the horizontal blanking period so as to reduce the required capacity of the memory 2.

Each of the element circuits will hereinafter be described in detail.

Figure 9:
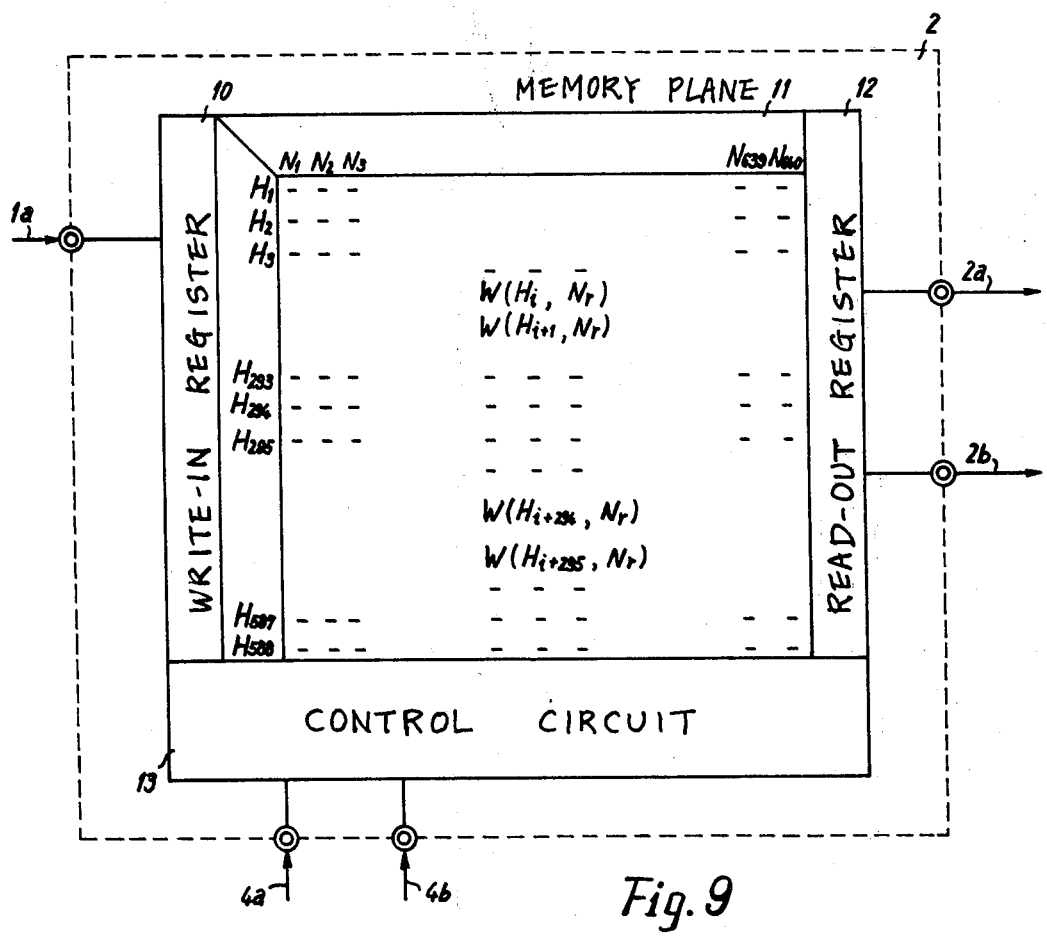
FIG. 9 is a block diagram illustrating an example of a memory employed in the example shown in FIG. 7.

The memory 2 comprises, as shown in FIG. 9, a write-in register 10, a memory matric plane 11, a read-out register 12 and a control circuit 13, and this memory 2 has a memory capacity of 588 $\times$ 640 = 376,320 words (1 word = 8 bits) for storing the information of 588 lines. The addresses of the memory 2 are indicated by a combination ($H_i$, $N_r$) using the aforementioned H numbers and N numbers, and the word information of each address is identified by a combination W ($H_i$, $N_r$), (i = 1, 2, ..., 294, i + 294 = 295, 296, ..., 588, r = 1, 2, ..., 640).

The write-in register 10 sequentially stores therein the information of 588 lines from ($H_1$, $N_1$) to ($H_{588}$, $N_{640}$) every word under control of the control circuit 13 and holds the information until the next frame is written. The control circuit 13 comprises, as is well known for a memory matrix, an address register, an address decoder, a word driver, a timing-and-control device, etc.

The read-out register 12 reads-out through a sense amplifier and data selector (not shown), as is well known, information of two adjacent lines in one frame from the information of the stored first and second fields under control of the control circuit 13 for effecting the above line combining, that is, weight combining as will be described later. Namely, the read-out register 12 supplies to the line combiner 3 information of an address W($H_i$, $N_r$) of the first field and information of an address W ($H_{i + 294}$, $N_r$) of the second field in the 8-bit parallel form.

Thus, the write-in operation is achieved in the cycle of $H_a$ = 64$\mu$s for one line and $V_a$ = 20 ms for one field. The read-out operation is achieved in the cycle of H = 63.5$\mu$s for one line and V = 16.7 ms for one field.

Figure 10:
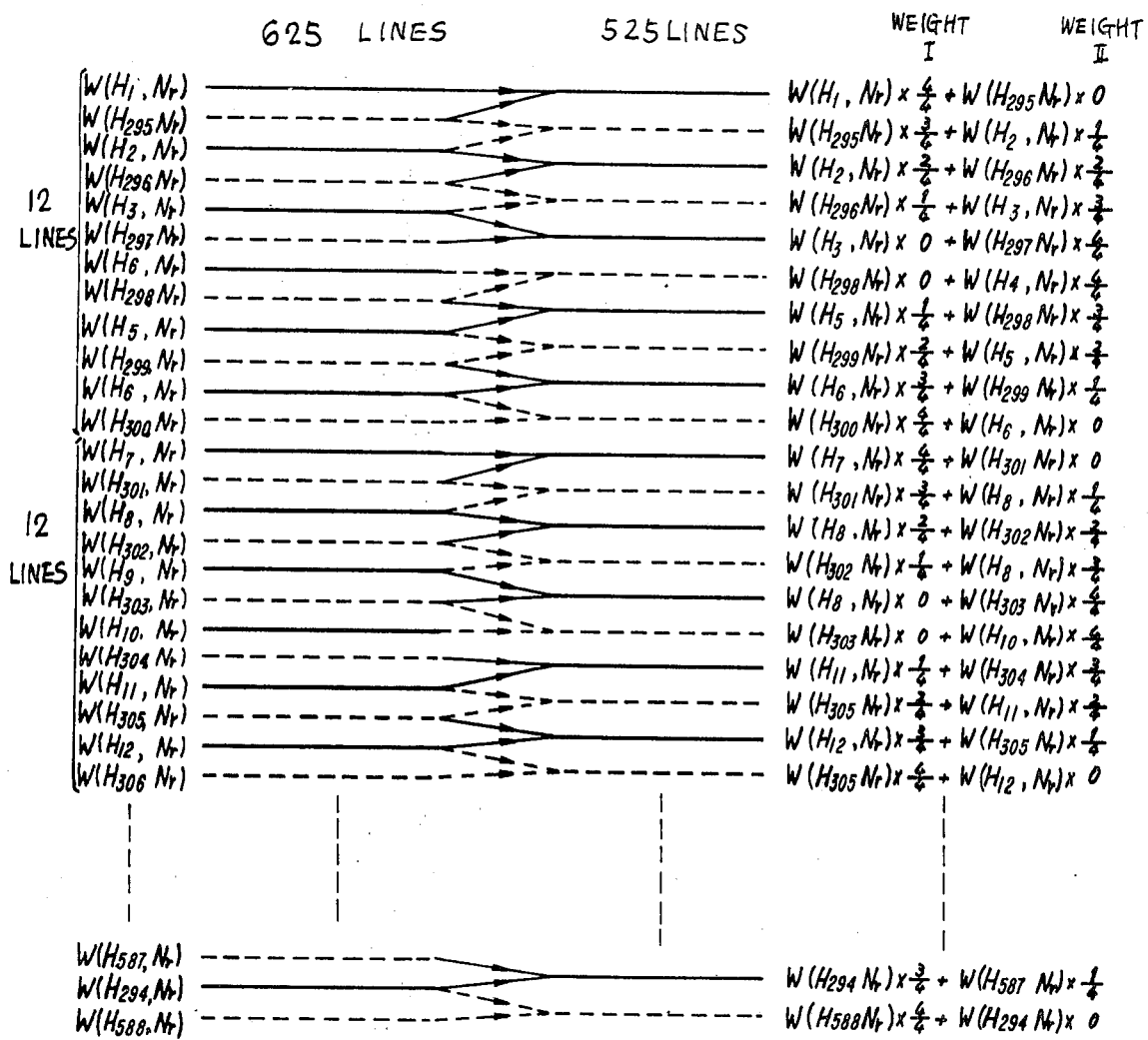
FIG. 10 is a line arrangement diagram explanatory of line combining according to this invention.
Figure 11:
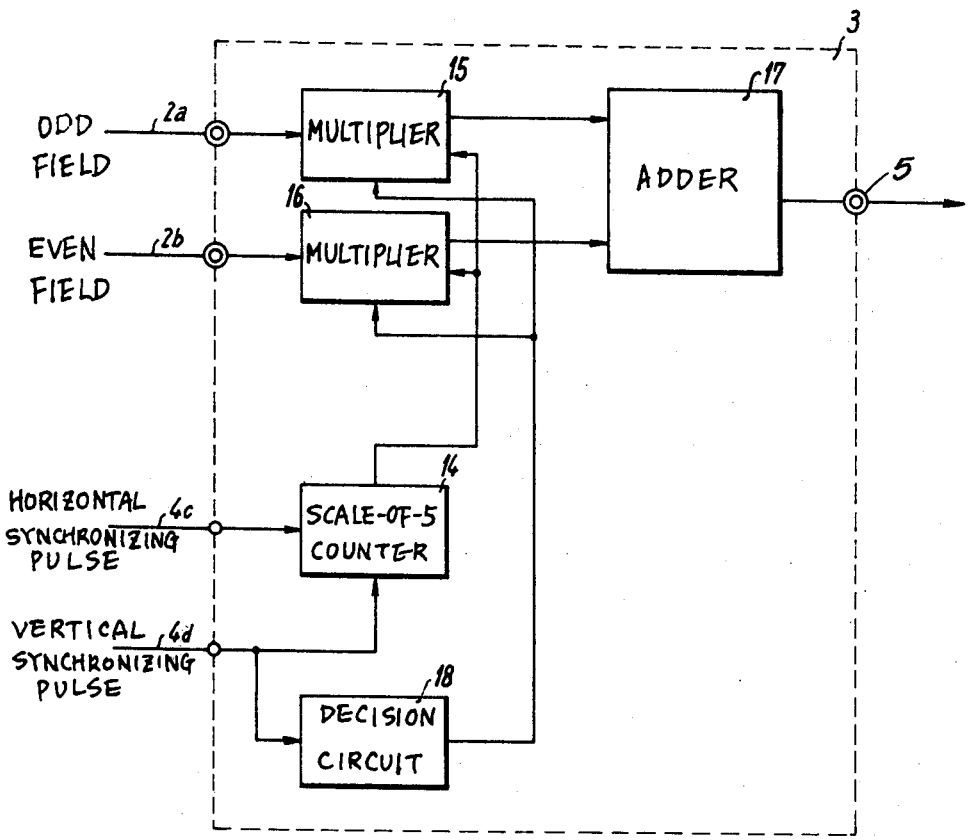
FIG. 11 is a block diagram illustrating an example of a line combiner employed in the example shown in FIG. 7.

The line combiner 3 sequentially weights and combines the information from the read-out register 12, that is, weight-combines adjacent lines of one frame every 10 lines to convert them into information of 5 lines, as shown in FIG. 10. In FIG. 10, solid-line arrows indicate the case of forming an odd-number field, and broken-line arrows indicate the case of forming an even-number field. FIG. 11 is a block diagram illustrating an example of the line combiner 3. An input line 2a receives the information of the lines of the first field (the odd-number field), and an input line 2b receives the information of the lines of the second field (the even-number field). As described above, the line combiner 3 combines the above information every 10 lines while changing weight factors in such an order, for example, as shown in Table 1. The line combiner 3 is composed of a scale-of-five counter 14 for obtaining information of 5 lines, 8-digit binary multipliers 15 and 16 whose multiples are controlled by the above counter 14, an 8-digit binary adder 17 and a field decision circuit 18 for detecting whether the odd-number field or the even-number field in response to vertical synchronizing pulses to actuate the corresponding one group of different multiple groups of the multipliers 15 and 16. The field decision circuit 18 comprises, for example, a cascade integrator circuit a disclosed in "Television Engineering", McGRAW-HILL BOOK COMPANY, Inc., 1952, pages 205 to 206 to detect vertical synchronizing pulses, and a binary counter for counting the detected vertical synchronizing pulses.

Table 1

| State of Counter | Multiple | | | |
|---|---|---|---|---|
| | Odd-number field | | Even-number field | |
| | Multiplier 15 | Multiplier 16 | Multiplier 15 | Multiplier 16 |
| 0 | 4/4 | 0 | 3/4 | 1/4 |
| 1 | 2/4 | 2/4 | 1/4 | 3/4 |
| 2 | 0 | 4/4 | 0 | 4/4 |
| 3 | 1/4 | 3/4 | 2/4 | 2/4 |
| 4 | 3/4 | 1/4 | 4/4 | 0 |

The line signal thus obtained is led to the signal output terminal 5.

Since conversion from 525 lines to 625 lines can be achieved by substantially the same element circuits and the same control system as those in the system described above, detailed descriptions are omitted.

Although the foregoing description has been given in connection with the case where the line information of the television signal to be converted is digitalized and stored in the memory, it is a matter of course that the line information can be stored and processed as analog information by the employment of charge coupled devices (CCD) or the like.

As has been described in the foregoing, the converted television signal of the present invention, is extremely improved in distortion of a picture and in deterioration of its waveform as compared with the signal obtainable with the conventional system. Therefore, the invention is applicable not only to the signal conversion of commercial television systems of different number of fields but also to the system conversion of picturephones of the same number of fields.

What we claim is:

1. A system for converting the number of lines of an input television signal having frames each formed by two adjacent interlaced fields, comprising:

input terminal means for receiving said input television signal;

memory means connected to said input terminal means for successively storing said input television signal;

first synchronizing terminal means for receiving horizontal synchronizing pulses and vertical synchronizing pulses of said input television signal;

second synchronizing terminal means for receiving horizontal synchronizing pulses and vertical synchronizing pulses of an output television signal to be obtained;

address circuit means connected to said memory means, said first synchronizing terminal means and said second synchronizing terminal means for performing the write-in operation to the memory means in response to said horizontal synchronizing pulses and said vertical synchronizing pulses of the first synchronizing terminal means and for performing the read-out operation from the memory means in response to said horizontal synchronizing pulses and said vertical synchronizing pulses of said second synchronizing terminal means;

line combiner means connected to said memory means and said second synchronizing terminal means for forming each interlaced frame of said output television signal by signals of two adjacent fields of said input television signal read-out from said memory means in response to said horizontal synchronizing pulses and said vertical synchronizing pulses of said second synchronizing terminal means under a condition where signals of each field of said each frame of said output television signal are formed by sequentially weighting and combining line signals of the former and the latter of the two fields of said input television signal so that the order of lines is not reversed in said output frame while the lines are not repeated in the same field; and output terminal means connected to said line combiner means for obtaining said output television signal.

2. A system according to claim 1, in which said line combiner means comprises first multiplier means connected to said memory means for multiplying the line signals of an odd field of said input television signal readout from said memory means, second multiplier means connected to said memory means for multiplying the line signals of an even field of said input television signal readout from the memory means, a scale-of-n counter means counting the horizontal synchronizing pulses of said second synchronizing terminal means after resetting by each of said vertical synchronizing pulses of said second synchronizing terminal means for varying the multiples of said first multiplier means and said second multiplier means in accordance with the states thereof, a decision circuit for detecting whether the odd number field or the even number field in response to the vertical synchronizing pulses of said second synchronizing terminal means to actuate corresponding one group of different multiple groups of the first multiplier means and the second multiplier means, and an adder means connected to the outputs of said first multiplier means and the second multiplier means and the output terminal means to provide an added output as said output television signal at said output terminal means.

* * * * *